Patented Mar. 7, 1933

1,900,235

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

MAGNESIUM CARBONATE AND MANUFACTURING PROCESS THEREOF

No Drawing. Application filed April 18, 1928. Serial No. 271,109.

This invention relates to magnesia and the manufacturing process thereof. It is addressed to improving both the product and the process of manufacture. It is applicable in obtaining magnesia by precipitation from solution.

The magnesia referred to herein is the usual light magnesium carbonate of commerce, which is a basic hydrated magnesium carbonate having approximately the composition $3Mg.CO_3.Mg(OH)_2.3H_2O$. The desired product of commerce consists of very finely-divided particles comprising an extremely light and bulky mass. In order to obtain a product having these desired physical properties, magnesia is precipitated by rapidly heating a solution of magnesium acid carbonate, i. e., $Mg(HCO_3)_2$.

According to methods hitherto known for obtaining magnesia by precipitation from solution, considerable difficulty has been experienced due to spontaneous formation of relatively large magnesia crystals both prior to and during the precipitation step. The formation of these crystals causes difficulty and is objectionable chiefly on account of their physical structure. The value, for example, of magnesia for heat insulating materials, a use to which magnesia is extensively put, depends chiefly upon its lightness and bulkiness, with which is associated a high degree of porosity in the molded insulation, and this desired porosity has not been obtained because of the formation of these undesirable crystals.

Where there is spontaneous crystallization in raw magnesia liquor, a proportion of the crystals are afforded opportunity of building up and becoming relatively large and well defined in comparison to the particles of light magnesia. As the crystals are relatively large and heavy, they are analogous to grit in a substance that is preferably of uniform and of light and powdery consistency. Moreover, where a certain proportion of magnesia takes the form of relatively large crystals, there is a corresponding decrease in total volume yield of light magnesia.

When, prior to the precipitation step, it becomes necessary to filter magnesia liquor, as, for example, when a by-product must be filtered off, there is substantial loss of yield where magnesia has crystallized from the liquor. Moreover, in such cases, the crystals tend to clog the filters and remain admixed with the solid substances filtered off.

It is the object of my invention to retard the formation of these undesirable magnesia crystals from solution.

I will now briefly describe certain essential steps of a common method of manufacturing magnesia from a rock consisting principally of calcium carbonate and magnesium carbonate. A dilute suspension of calcium hydroxide and magnesium hydroxide is prepared from the rock by suitable means. For the purpose of separating the lime from the magnesia, this suspension is treated with carbonic acid by saturating the suspension with carbon dioxide under pressure. The lime is precipitated as calcium carbonate (whiting) which is quite insoluble and may be filtered off. The magnesia, on the other hand, goes into solution as magnesium bicarbonate. This solution is relatively stable provided the concentration is less than two per cent. After filtering off the whiting, the magnesium bicarbonate solution is subjected to rapid heating, as with live steam, which precipitates basic hydrated magnesium carbonate as a bulky, finely-divided, very white and highly-flocculated powder. The precipitated magnesia may then be recovered by any suitable means, such as sedimentation or filtration.

In carrying out the process as above described, the dilute solution containing magnesium bicarbonate is only relatively stable, as crystals of magnesium carbonate tend to form spontaneously from the raw liquor, within the limits of concentration used in commercial manufacture. If the crystals are formed prior to the filtration of the whiting, they are filtered off with it with consequent loss of yield and clogging of filters. Where the crystallization takes place subsequently, the crystals become commingled with the light magnesia, which is undesirable. While crystals tend to form more rapidly at higher temperatures, there is a material formation of them at all temperatures at which the process may be practically used. In the commercial operation of the process the temperature of the raw magnesia liquor varies between approximately 70° F. and 85° F., the temperatures occurring in the winter running somewhat lower than in the summer. While the formation of crystals increases with the length of time the solution stands, there is a material formation of them during the length of time that the solution stands in carrying out the process commercially. The tendency to form magnesium carbonate crystals spontaneously is increased, under normal operating conditions by the agitation and temperature increases, incident to necessary handling of the raw liquor. It is the object of my invention, as aforementioned, to retard the formation of these objectionable crystals.

By my invention, I introduce into the raw magnesia liquor a substance which retards the crystallization of magnesium carbonate from solution or which, upon being introduced into the solution, forms a substance which retards the crystallization of magnesium carbonate. While I have found no substance which will entirely prevent magnesium carbonate crystals from being formed in magnesium bicarbonate solution indefinitely, I have found that, by the addition of certain substances, crystallization of magnesium carbonate is greatly retarded and I am able to produce in my final product a material in which the objectionable particles having a definite external crystal form are greatly reduced in quantity.

Where crystallization is retarded by a retarding agent, the length of time required for complete crystallization from solution is increased and the rate of crystallization is decreased. The addition of a suitable retarding agent according to my invention, by materially diminishing the quantity of objectionable crystals spontaneously formed, increases the yield, betters the product, and facilitates the process. Furthermore, the addition of a retarding agent has the beneficial effect of preventing crystals that are formed notwithstanding the presence of the agent, from building up to the size that they would have under like conditions in the absence of such an agent.

I have found in carrying out my invention that, by use of the retarding agent, the crystallization is retarded to such an extent that the magnesium carbonate produced contains comparatively few particles having a diameter in excess of one micron, although the method of producing this product, except for my invention, and the time utilized for the production of the product, are substantially the same as heretofore used in the production of magnesium carbonate, in which product the objectionable particles, heretofore referred to, were produced and in which a great quantity of particles were larger than one micron in diameter.

Another advantage resulting from use of retarding agents according to my invention is that the process may be carried on with a higher concentration of magnesium bicarbonate in the raw liquor than is possible without their presence. Operation of the process with increased concentration of magnesium bicarbonate in the raw liquor, increases the yield obtainable from an equipment capable of handling a given quantity of liquid and decreases the amount of water that has to be used, handled, filtered and heated. There is consequent increased economy of operation, where a retarding agent is used according to my invention.

A wide variety of substances act as retarding agents. I have found that, in general, substances which give the best results have pronounced colloidal properties. Some molecularly soluble substances, however, give very good results. Also certain substances which form thin surface films on water are found to act as effective retarding agents when dispersed through the solution by agitation. A retarding agent must be capable of existing in solution or dispersed phase without reacting chemically to modify the composition of the raw liquor beyond the limits required for the manufacture of a satisfactory magnesia product. Magnesium bicarbonate in solution is quite sensitive to both acids and alkalies, excepting very weak acids and alkalies. Weak fatty acids may be dispersed through a solution of magnesium carbonate without objectionable chemical effect and a number of them when so dispersed constitute some of the best of the retarding agents. Oily, waxy, gummy or saponaceous substances are particularly suitable as retarding agents. Sulphonated oils or sulphonated fatty acids also are satisfactory. Organic substances of widely different classes are found that give the desired retarding effect. Among substances of the same class, the retarding properties of some are superior to others. A number of substances which are retarding agents are also bubble-forming and stabilizing agents. Bubble-forming and stabilizing agents are substances which, if introduced even in small amounts into water or mixtures of water and finely-divided solid materials, will facilitate the formation and stabilization of minute bubbles of air or other gas, whether the gas is introduced by mechanical agitation to entrap air or produced by a chemical reaction within the mixture. This is of great practical importance, for, when magnesia is precipitated from a solution containing such an agent, it adsorbs a considerable proportion of the agent used and, if magnesia so produced is subsequently mixed with asbestos and water in the manufacture of heat-insulating materials, the presence of a bubble-forming and stabilizing agent upon the magnesia used, is of value because it aids in the production of moulded insulation having greater porosity, lower density, and higher insulation efficiency.

Substances which I prefer to use and which appear to be the most suitable, are sulphonated castor oil, sulphonated oleic acid and oleic acid. Other substances which may be used satisfactorily are saponin, "Monopol" oil, gelatin, sodium soap of sulphonated castor oil, gum arabic, and sodium caseinate.

I prefer in practical operation to use not more than .5% of the retarding agent calculated on the dry yield of the magnesia in solution and a smaller amount, such as .1% is ordinarily sufficient.

In determining the amount of retarding agent to be used within practical limits, the following general principles may be borne in mind; that increased amounts of retarding agent give increased effect in retarding the crystallization of magnesium carbonate; that the retarding effect is less at higher temperature, i. e., precipitation takes place more rapidly; and that the retarding effect of some agents is greater than that of others.

To employ my invention, any suitable means may be used for dispersing a retarding agent in raw magnesia liquor from which retardation of crystallization is desired.

I shall now more particularly describe my invention as applied in the process and embodied in the product of the manufacture of light magnesium carbonate and will describe the manner and result of its use in certain of the steps hereinbefore referred to, of a process for manufacturing magnesia from a rock containing calcium carbonate and magnesium carbonate.

Thus, for example, .5% by weight of the dry magnesium carbonate in solution, of sulphonated castor oil may be added and dispersed through the magnesia solution before the precipitation and the separation of the whiting. If the temperature is maintained at 85° F. only about 21% of the crystallized magnesia will form that would have formed had there been no retarding agent present, when the raw liquor has been permitted to stand for five hours. The retarding agent may, however, be added at other stages of the process. For example, it may be added after the whiting has been filtered off and, if the raw liquor is not permitted to stand too long prior to the addition of the retarding agent, the retarding agent will still be effective, according to my invention, to a certain degree. In commercial practice of this process, the length of time that the raw liquor is allowed to stand varies. The time taken in manipulation is appreciable in any event. Under normal conditions, the raw liquor flows into a large storage tank, the flow to and from the tank being continuous. In such case, there is always a proportion of the liquid which has stood in the tank for a longer time and the older liquor is never completely emptied and replaced by fresh.

I have found that my invention is effective under the usual manufacturing conditions and does not require for its applicability further especial modifications of the several steps in the magnesia manufacturing process.

I have attempted to show and desire to have it understood that my invention is applicable not only to the specific process described above but to any process of manufacturing magnesium carbonate wherein the magnesia is precipitated by heating a magnesium bicarbonate solution and pertains generally to such a process and the product obtained therefrom.

I claim:

1. The process of manufacturing light magnesia comprising precipitation of magnesia from raw magnesia liquor in which is dispersed a substance selected from the group consisting of sulfonated oils, sulfonated fatty acids, gelatin, gum arabic, alkali metal derivatives of casein, saponin, and higher organic fatty acids.

2. The process of manufacturing light magnesia comprising precipitation of magnesia from raw magnesia liquor in which is dispersed an agent that retards the crystallization of magnesium carbonate and that is also a bubble-forming and stabilizing agent.

3. The process of manufacturing light magnesium carbonate comprising preparing a solution of magnesium bicarbonate, dispersing therein a substance selected from a group consisting of sulfonated oils, sulfonated fatty acids, gelatin, gum arabic, alkali metal derivatives of casein, saponin, and higher organic fatty acids, and precipitating the magnesia from the solution by means of heat.

4. The process of manufacturing light magnesia by precipitation from a solution containing magnesium bicarbonate in which is dispersed not more than .5% by weight of the dry magnesium carbonate in the solution, of sulphonated castor oil.

5. The process of manufacturing light magnesium carbonate comprising preparing a solution of magnesium bicarbonate, dispersing therein not more than .5% by weight of the dry magnesium carbonate in the solution, of sulphonated castor oil, and precipitating the magnesia by subjecting the solution to heat.

6. The process of manufacturing light magnesia from a rock containing calcium carbonate and magnesium carbonate, comprising preparing a suspension of calcium hydroxide and magnesium hydroxide, saturating the suspension with carbon dioxide under pressure, dispersing therein a substance selected from a group consisting of sulfonated oils, sulfonated fatty acids, gelatin, gum arabic, alkali metal derivatives of casein, saponin, and higher organic fatty acids, filtering off the whiting, and precipitating the magnesia by subjecting the solution to the action of live steam.

7. Light magnesium carbonate precipitated by means of heat from a solution containing magnesium bicarbonate and a substance selected from the group consisting of sulfonated oils, sulfonated fatty acids, gelatin, gum arabic, alkali meal derivatives of casein, saponin, and higher organic fatty acids.

8. Light magnesium carbonate precipitated from a solution containing magnesium bicarbonate and an agent dispersed therein that retards crystallization of magnesium carbonate and that is a bubble-forming and stabilizing agent.

9. Light magnesium carbonate precipitated by heat from a solution containing magnesium bicarbonate and an agent dispersed therein that retards crystallization of magnesium carbonate and that is a bubble-forming and stabilizing agent.

10. Light magnesium carbonate precipitated by heat from a solution containing magnesium bicarbonate and sulphonated castor oil dispersed therein, in an amount not exceeding .5% by weight of the dry magnesium carbonate contained in the solution.

11. Light magnesium carbonate containing minute quantities of a substance selected from a group consisting of sulfonated oils, sulfonated fatty acids, gelatin, gum arabic, alkali metal derivatives of casein, saponin, and higher organic fatty acids.

12. Light magnesium carbonate containing minute quantities of an agent that retards the crystallization of magnesium carbonate from magnesium bicarbonate solution and that is a bubble-forming and stabilizing agent.

13. Light magnesium carbonate that contains comparatively few particles having definite external crystal form and that contains minute quantities of a substance selected from a group consisting of sulfonated oils, sulfonated fatty acids, gelatin, gum arabic, alkali metal derivatives of casein, saponin, and higher organic fatty acids.

14. Light magnesium carbonate that contains compartively few particles having definite external crystal form and that contains minute quantities of sulphonated castor oil.

15. Light magnesium carbonate composed of extremely fine particles substantially lacking in definite external crystal form produced by precipitation with heat from a solution of magnesium bicarbonate containing a substance selected from a group consisting of sulfonated oils, sulfonated fatty acids, gelatin, gum arabic, alkali metal derivatives of casein, saponin, and higher organic fatty acids.

16. Light magnesium carbonate containing comparatively few particles having a diameter greater than one micron and containing minute quantities of a substance selected from a group consisting of sulfonated oils, sulfonated fatty acids, gelatin, gum arabic, alkali metal derivatives of casein, saponin, and higher organic fatty acids.

17. The process of manufacturing light magnesia comprising precipitation of magnesia from raw magnesia liquor in which is dispersed a crystallization retarding agent.

18. Light magnesium carbonate precipitated from a solution containing magnesium bicarbonate and a crystallization retarding agent.

19. The process of manufacturing light basic hydrated magnesium carbonate comprising preparing a solution of magnesium bicarbonate in which is dispersed a crystallization retarding agent, and precipitating basic magnesium carbonate from the solution by means of heat.

20. In a process of manufacturing basic hydrated magnesium carbonate wherein said basic hydrated magnesium carbonate is precipitated by heating magnesium bicarbonate liquor, the step comprising including in the magnesium bicarbonate liquor a substance having a retarding effect on the crystallization of basic hydrated magnesium carbonate.

21. Light magnesium carbonate precipitated from magnesium bicarbonated liquor containing a substance having a retarding effect on crystallization of basic hydrated magnesium carbonate.

22. Light magnesium carbonate, the particles of which are extremely minute and substantially lacking in definite external crystal form, precipitated by rapidly heating magnesium bicarbonate solution containing a substance having a retarding effect on the crystallization of basic hydrated magnesium carbonate.

In testimony whereof, I have signed my name to this specification.

HAROLD W. GREIDER.